United States Patent [19]

Ohbuchi et al.

[11] Patent Number: 4,483,180

[45] Date of Patent: Nov. 20, 1984

[54] METHOD AND DEVICE FOR CHECKING AN OPERATING CONDITION OF AN INTERNAL COMBUSTION ENGINE

[75] Inventors: Hiroyuki Ohbuchi, Tokyo; Hideo Sobue, Nagoya, both of Japan

[73] Assignees: Nissan Motor Company, Limited, Kanagawa; NGK Spark Plug Co., Ltd., Aichi, both of Japan

[21] Appl. No.: 343,818

[22] Filed: Jan. 29, 1982

[30] Foreign Application Priority Data

Jan. 30, 1981 [JP] Japan ................. 56-13035

[51] Int. Cl.³ .............................................. G01L 23/22
[52] U.S. Cl. .................................................... 73/35
[58] Field of Search ...................... 73/35; 123/425, 435

[56] References Cited

U.S. PATENT DOCUMENTS

| | | | |
|---|---|---|---|
| 2,534,276 | 12/1950 | Lancor | 73/35 |
| 2,867,766 | 1/1959 | Broder et al. | 73/35 X |
| 2,879,665 | 3/1959 | Adams | 73/35 |
| 3,218,843 | 11/1965 | Lindsey | 73/35 |
| 3,504,533 | 4/1970 | Rodewalt | 73/652 |
| 4,249,494 | 2/1981 | Guipaud | 73/35 X |

Primary Examiner—James J. Gill
Attorney, Agent, or Firm—Lowe, King, Price & Becker

[57] ABSTRACT

A device for detecting knocking in individual cylinders of a multicylinder engines comprises a movable vibration sensor, an ignition pulse detector, a control circuit and a control console. The ignition pulse detector is a clip for the ignition cable of the specified which can detect propagation of the high-voltage ignition signal therethrough without damage the insulation. The signal from the vibration sensor is checked for a threshold amplitude at a frequency indicative of knocking. If the threshold is exceeded and the ignition detector simultaneously detects an ignition pulse for the specified cylinder, the control circuit outputs a signal to operate an indicator on the console. The console also includes a selector for adjusting the knocking amplitude threshold.

8 Claims, 4 Drawing Figures

METHOD AND DEVICE FOR CHECKING AN OPERATING CONDITION OF AN INTERNAL COMBUSTION ENGINE

BACKGROUND OF THE INVENTION

The present invention relates generally to a method and a device for checking the operating condition of an internal combustion engine. More particularly, the invention relates to a method and a device for checking for knocking condition in each individual cylinder of the internal combustion engine.

In automotive vehicles, one common maintenance procedure is detection of knocking in the engine. This monitors the combustion efficiency of the engine. In practice, checking the knocking condition of the engine is conventionally performed by detecting the knocking condition of the engine as a whole instead of that of each individual cylinder. Therefore, there has been no way to detect which cylinder is malfunctioning or knocking. Particularly, in case in which the engine to be checked is a multi-cylinder fuel-injected engine, this checking method is ineffective in detecting knocking in one of the individual cylinders.

At maintenance centers or service shops, it is the conventional practice to service a knocking fuel-injected engine by replacing all the fuel injector nozzles and/or all of the ignition plugs of all cylinders. This leads to unnecessarily expensive maintainance of the engine.

To eliminate such conventional disadvantages, it is necessary to provide a device and/or method for detecting knocking of each individual cylinder. This can be done by detecting engine knocking synchronously with the onset of combustion in each specific cylinder.

SUMMARY OF THE INVENTION

Therefore, it is an object of the present invention to provide a device for easily detecting knocking in each individual cylinder in an internal combustion engine.

Another object of the invention is to provide a method for detecting knocking in individual cylinders of the internal combustion engine.

To accomplish the above-mentioned and other objects, a device for checking the operation of the internal combustion engine, according to the present invention, has means for detecting engine knocking vibrations. The knocking detecting means produces a knocking signal when engine vibration exceeding a predetermined variable knocking vibration threshold is detected after spark ignition in the specific cylinder to be checked is effected.

According to another aspect of the invention, there is provided a method for detecting knocking of each individual cylinder by detecting knocking of the engine synchronously with spark ignition in the engine cylinder to be checked. Engine vibration is checked to detect knocking of the engine and propagation of the spark ignition pulse from the distributor is detected. Indication of knocking of the specific cylinder is made when knocking vibration of the engine is detected and spark ignition is effected in the specific cylinder at the same time.

BRIEF DESCRIPTION OF THE DRAWINGS

The present invention will more fully understood from the description in detail given herebelow and from the accompanying drawings of the preferred embodiment of the present invention, which, however, should not be taken as limitative to the invention but for elucidation and explanation only.

In the drawings.

DESCRIPTION OF THE PREFERRED EMBODIMENT

Figure 1:
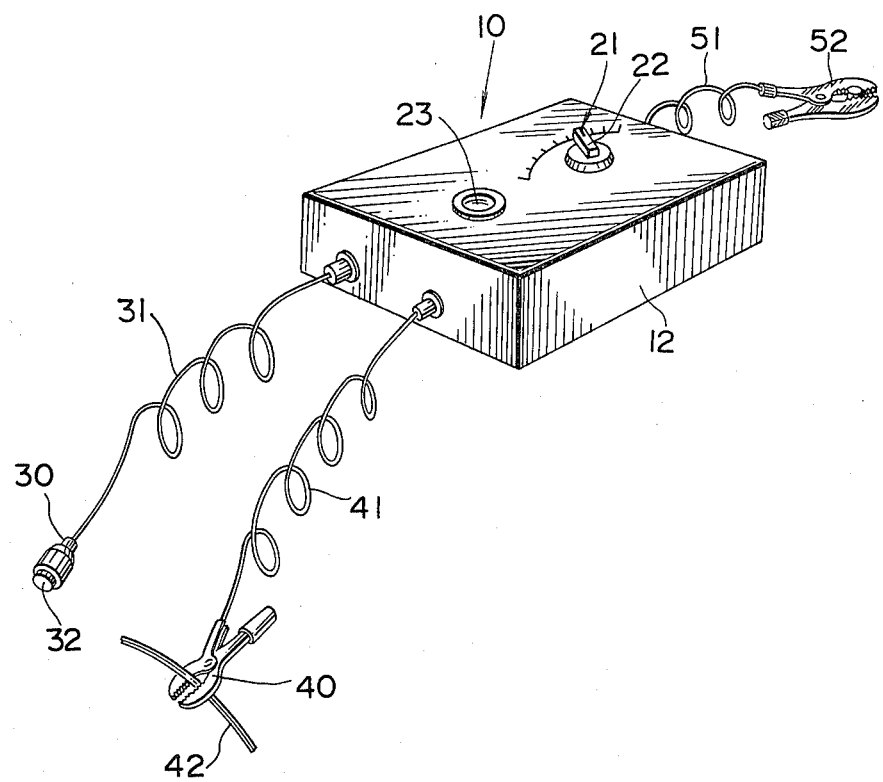
FIG. 1 is a perspective view of the detecting device according to the present invention.
Figure 2:
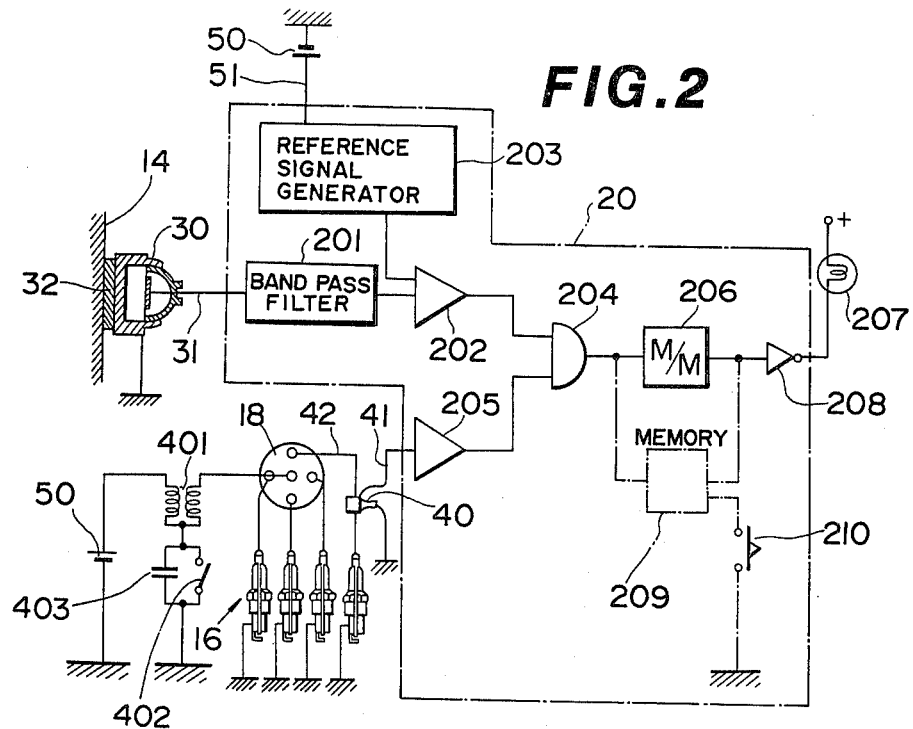
FIG. 2 is a block diagram of the device of FIG. 1.

Referring now to the drawings, particularly to FIG. 1, there is illustrated a detector unit 10 of the preferred embodiment of the present invention. A detector circuit 20 illustrated in FIG. 2 is supported within a detector housing 12. A knocking sensor 30 is connected to the detector circuit 20 with a line 31. The knocking sensor 30 incorporates a magnet 32 for magnetically attaching the knocking sensor 30 to the engine cylinder block 14 near the cylinder to be checked. An electrically conductive clip 40 is also connected to the detector circuit 20 via a line 41. The clip 40 is adapted to grip a cable 42 connecting an ignition plug 16 with a distributer 18. On the other hand, the detector circuit 20 is connected to a vehicle battery 50 with a line 51 and a clip 52 for gripping the battery terminal.

The detector circuit 20 incorporates a knocking level selector switch 21 which can adjust the knocking level detection threshold, as will be explained hereinbelow. An indicator 23 provided on the detector housing 12 flashes when the engine knocking is detected.

In FIG. 2, the details of the detector circuit 20 are illustrated. The knocking sensor 30 converts sensed engine vibrations into a voltage signal including frequency and amplitude information and supplies this sensor signal to a band-pass filter 201. The filter 201 eliminates noise components in the sensor signal to output a filter output $S_0$ representative of the engine vibration magnitude to a comparator 202. The comparator 202 also receives a reference signal $V_{ref}$ representative of the knocking level detection threshold from a reference signal generator 203. The reference signal generator 203 serves to adjust the reference signal value $V_{ref}$ in response to manual operation of the knocking level selector switch 21. The comparator 202 produces a pulse form comparator signal $S_1$ when the filter output value $S_0$ exceeds the reference signal value $V_{ref}$. The comparator signal $S_1$ constitutes one input to an AND-gate 204.

To the other input of the AND-gate 204, an ignition signal generator 205 is connected. The ignition signal generator 205 is, in turn connected to the clip 40 via the line 41. The clip 40 grips an appropriate portion of the cable 42 to pick up the ignition pulse I created by an ignition coil 401 including a circuit braker 402 and a capacitor 403 and transmitted through a distributor 18. The ignition signal generator 205 detects the timing of combustion in the cylinder to be checked by picking up the ignition pulse I transmitted from the distributor 18 to the ignition plug 16.

It should be noted that although the cable connecting the distributor to the ignition plug is covered with an insulating layer, the clip 40 can pick up the ignition pulse by induction or other well-known effects since the ignition pulse I is transmitted through the cable has a rather high voltage.

Figure 4:
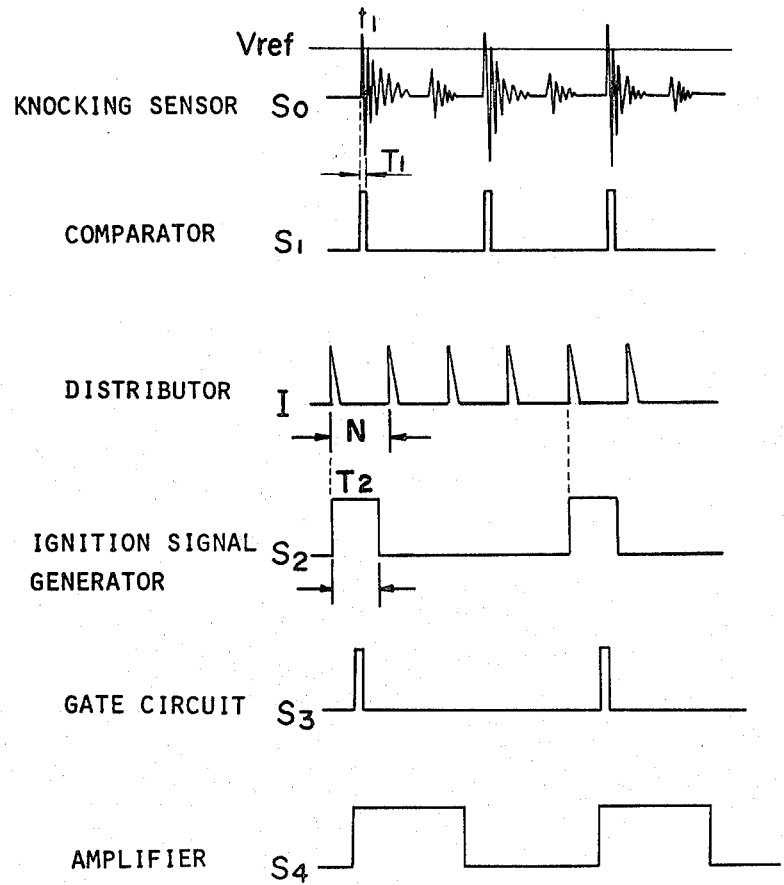
FIG. 4 is a timing chart for the device of FIG. 1.

In addition, as shown in FIG. 4, the distributor 18 produces ignition pulses for all of the cylinders (in this exemplary case, four) of the engines, but due to the localized detection by the clip 40, ignition pulses detected during a cycle N of ignition of all the cylinders will correspond only to the specified cylinder.

The ignition signal generator 205 is responsive to the ignition pulse to produce a substantially constant pulse width ignition signal $S_2$. The AND-gate 204 is responsive to the ignition signal $S_2$ when inputted simultaneously with the comparator signal $S_1$ fed from the comparator 202. The AND-gate output $S_3$ is fed to a monostable multivibrator 206. The monostable multivibrator 206 produces a pulse signal $S_4$ having a predetermined pulse width, 0.2-0.3 sec, for example. The pulse signal $S_4$ is fed to the indictor lamp 207 via an invertor 208 to turn the lamp on.

As illustrated by phantom line, a memory circuit 209 can be inserted as a replacement of the monostable multivibrator 204 between the AND-gate 204 and the invertor 208. When such a memory circuit 209 is employed, it is necessary to also provide a reset switch 210 for clearing the contents of the memory.

Figure 3:
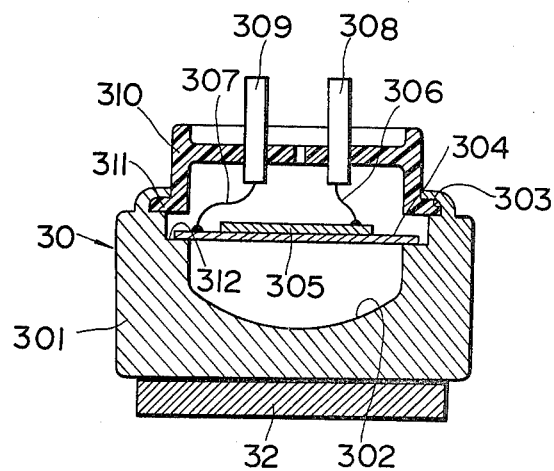
FIG. 3 is an enlarged section of a knocking sensor used in the device of FIG. 1.

As shown in FIG. 3, the knocking sensor 30 comprises a sensor housing 301 having a substantially circular bore 302. A groove 303 extends along the inner circumference of the upper end of the bore 302. The sensor housing 301 is formed with a step 312 on the inner circumference of the bore 302 below the groove 303. A disc-shaped thin metal plate 304 is secured to the step 312 at its circumferential edge. A piezoelectric disc 305 is fixedly mounted to the center of the metal plate 304. The metal plate 304 and the piezoelectric plate 305 are respectively connected to the band-pass filter 201 via lines 306 and 307 and output terminals 308 and 309. The output terminals 308 and 309 are supported by nonconductive cap member 310 with a circumferentially-extending flange 311 which engages the groove 303.

At the other end, the magnet 32 is bonded to the bottom of the sensor housing 301 with an adhesive such as epoxy resin adhesive. The magnet magnetically can secure the sensor housing to almost any position on the engine cylinder block.

In order to check the knocking condition of each specific cylinder, the knocking sensor 30 is attached to the engine cylinder block 14 via the magnet 32 at a position near the specific cylinder to be checked. The knocking sensor 30 thus vibrates with the specified cylinder so that the piezoelectric plate 305 produces a signal having value proportional to the magnitude of the cylinder vibration. This signal is fed to the band-pass filter 201 as the sensor signal $S_0$ as shown in FIG. 4. The sensor signal is fed to the comparator 202 via the band-pass filter 201. Here, assuming the reference signal value $V_{ref}$ is as shown in FIG. 4 and the sensor signal value exceed the reference signal value $V_{ref}$ at a time $t_1$, the comparator 202 produces the comparator signal $S_1$ at $t_1$ in the form of a pulse of width $T_1$.

At the same time, the clip 40 is attached to the cable 42 connecting the distributor 18 and the spark plug 16 of the specific cylinder to be checked. At time $t_1$, the ignition pulse I is fed to the plug 16 to effect combustion in the specified cylinder. The ignition pulse is picked up by the clip to make the igniton signal generator 205 operative. The ignition signal generator 205 thus produces the ignition signal $S_2$ of constant pulse width $T_2$. As shown in FIG. 4, if the pulse width $T_2$ of the ignition signal overlaps with the pulse width $T_1$ of the comparator signal, the AND-gate 204 produces a gate output pulse $S_3$. The pulse width of the gate output is prolonged by the monostable multivibrator 206. The prolonged pulse width of the gate output (not shown to scale) should be sufficiently long to facilitate visual recognition of engine knocking via the indicator 23, for example 0.2 to 0.3 sec. The output of the monostable multivibrator 206 is fed to the indicator lamp 207 via the invertor 208 to turn the lamp on.

Thus, the knocking condition of a specific cylinder can be checked by the device of the present invention.

It should be appreciated, while the specific embodiment of the present invention has been illustrated hereinabove, the invention can be embodied otherwise without departing from the principle of the invention. For example, the construction of the knocking sensor for detecting engine vibration can be modified in any way. Therefore, any known vibration sensor adapted for detecting engine vibration can be utilized as the knocking sensor of the present invention. Similarly, detection of occurence of the spark ignition in the specific cylinder can be performed in other ways.

What is claimed is:

1. A device for checking an operating condition of an internal combustion engine comprising:
    a vibration sensor releasably attached to the engine cylinder block near one of the engine cylinders and producing a sensor signal representative of the magnitude of engine vibration near said one cylinder;
    a detector releasably attached to a cable interconnecting an ignition plug and a distributor and adapted to detect spark ignition in said one cylinder for producing a detector signal in response to the spark ignition;
    a circuit for discriminating the sensor signal value exceeding a threshold value and producing a discrimination signal when said sensor signal value is above the threshold value;
    a gating circuit connected to said discriminating circuit and said detector for producing an indicator signal when both of said discrimination signal and detector signal are simultaneously inputted; and an indicator actuatable for a predetermined period of time in response to said indicator signal.

2. A device for monitoring and checking an operating condition of an internal combustion engine comprising:
    a vibration sensor detachably attached onto an engine cylinder block adjacent a single engine cylinder to be checked and producing a sensor signal having a value proportional to a magnitude of engine vibration;
    a detector detachably attached to an ignition cable interconnecting an ignition plug of said one cylinder and a distributor and detecting occurrence of spark ignition in said single cylinder to produce a detector signal in response thereto;
    a discriminating circuit for discriminating said sensor signal value exceeding a predetermined knocking threshold to produce a discrimination signal indicative of a knocking condition in said single cylinder.
    a gating circuit responsive to said discriminating circuit and said detector for producing an indicator signal when both of said discrimination signal and detector signal are simultaneously inputted; and a visual indicator responsive to said indicator signal to turn on for a visually recognisable predetermined period for visual indication of a knocking condition of said single cylinder.

3. A device as set forth in claim 2, wherein said sensor includes a magnet for magnetically attaching the sensor to the engine block.

4. A device as set forth in claim 3, wherein said detector comprises an electrically conductive clip adapted for gripping an ignition cable connecting a distributor to a spark plug of said one cylinder to be checked and for picking up ignition pulses propagating through the ignition cable.

5. A device for checking an operating condition of an iternal combustion engine, comprising:
   a sensor releasably attached to the engine block near one of plural engine cylinders and producing a sensor signal representative of the magnitude of engine vibration near said one cylinder;
   a detector adapted to detect spark ignition in said one cylinder and producing a detector signal in response to the spark ignition;
   a circuit for discriminating when the sensor signal value exceeds a threshold value and producing a discrimination signal when the sensor signal value is above the threshold value and the detector signal is produced by the detector; and
   an indicator turned on for a predetermined period of time in response to said discriminating signal,
   wherein said detector comprises an electrically conductive strip adapted for gripping an ignition cable connecting a distributor to a spark plug of said one cylinder to be checked and for picking up ignition pulses propagating through the ignition cable.

6. A device as set forth in claim 5, wherein said circuit comprises a comparator for comparing the sensor signal value with a reference value representative of the threshold value to produce a comparator signal when the sensor signal value is above the reference value and a gate adapted to produce a discrimination signal when the comparator signal and the detector signal are produced simultaneously.

7. A device as set forth in claim 6, which further comprises a monostable multivibrator for prolonging pulse width of the comparator signal to prolong a period in which said indicator turns on to visual detection.

8. A method for checking operating condition of an internal combustion engine comprising the steps of:
   releasably fitting a vibration sensor for detecting engine vibration at a position adjacent a specific engine cylinder to detect a magnitude of vibration at the portion of the engine adjacent said specific cylinder;
   detecting spark ignition in said specific cylinder by means of an electrically conductive clip detachably gripping an ignition cable connected to a spark plug in said specific cylinder;
   discriminating the magnitude of the detected engine vibration exceeding a threshold level; and
   turning an indicator on for a period of time when the engine vibration magnitude is above the threshold value while spark ignition in said specific cylinder is detected, so that the indicator indicates a knocking condition in said specific cylinder.

* * * * *